US008005499B2

(12) United States Patent
Wigard et al.

(10) Patent No.: US 8,005,499 B2
(45) Date of Patent: Aug. 23, 2011

(54) METHOD, APPARATUS AND COMPUTER PROGRAM PROVIDING SIGNALING OF CONFIGURABLE POWER STEP SIZES FOR HIGH SPEED UPLINK PACKET ACCESS (HSUPA)

(75) Inventors: Jeroen Wigard, Klarup (DK); Karri Ranta-aho, Espoo (FI); Benoist Sebire, Beijing (CN)

(73) Assignee: Nokia Corporation, Espoo (FI)

( * ) Notice: Subject to any disclaimer, the term of this patent is extended or adjusted under 35 U.S.C. 154(b) by 750 days.

(21) Appl. No.: 11/429,048

(22) Filed: May 4, 2006

(65) Prior Publication Data

US 2006/0252450 A1 Nov. 9, 2006

Related U.S. Application Data

(60) Provisional application No. 60/678,046, filed on May 4, 2005.

(51) Int. Cl.
*H04B 7/00* (2006.01)

(52) U.S. Cl. ............ 455/522; 455/69; 455/70; 370/318; 370/320

(58) Field of Classification Search ............ 455/522, 455/13.4, 69, 70; 370/318–322
See application file for complete search history.

(56) References Cited

U.S. PATENT DOCUMENTS

| | | | | |
|---|---|---|---|---|
| 5,842,113 A * | 11/1998 | Nanda et al. | ..................... | 455/69 |
| 6,104,918 A | 8/2000 | Saario et al. | .................. | 455/126 |
| 6,311,070 B1 * | 10/2001 | Tong et al. | ..................... | 455/522 |
| 6,826,412 B2 * | 11/2004 | Baker et al. | ..................... | 455/522 |
| 6,983,166 B2 * | 1/2006 | Shiu et al. | ...................... | 455/522 |
| 2003/0195012 A1 * | 10/2003 | Baker et al. | ................... | 455/522 |
| 2003/0232622 A1 * | 12/2003 | Seo et al. | ....................... | 455/437 |
| 2005/0124373 A1 * | 6/2005 | Marinier | ........................ | 455/522 |
| 2005/0153726 A1 * | 7/2005 | Takano | ........................... | 455/522 |
| 2006/0223445 A1 * | 10/2006 | Baker et al. | ........................ | 455/69 |
| 2006/0240858 A1 * | 10/2006 | Yamazaki et al. | ............. | 455/522 |
| 2007/0149235 A1 * | 6/2007 | Chin et al. | ..................... | 455/522 |

FOREIGN PATENT DOCUMENTS

EP 1 146 491 A2 10/2001

(Continued)

OTHER PUBLICATIONS

"3rd Generation Partnership Project; Technical Specification Group Radio Access Network; Medium Access Control (MAC) protocol specification (Release 6)", #GPP TS 25.321 V6.4.0 (Mar. 2005), pp. 1-74.

(Continued)

*Primary Examiner* — Fayyaz Alam
(74) *Attorney, Agent, or Firm* — Harrington & Smith

(57) ABSTRACT

A set of power control step size increments are determined such that at least two step size increments differ from one another. The set is sent to a Mobile Station MS. A first power command to the MS informs of a first power for a uplink data transmission on a radio resource (E-DPDCH). To change power on the same radio resource, an offset is computed, the set of step size increments is accessed to determine which one, or combination of them, yield the offset, and the MS is informed of the second power by a second message that identifies those elements of the set that alone or in combination yield the offset. The MS determines the second power as a function of the first power and the step size increment(s) from the second message.

29 Claims, 2 Drawing Sheets

FOREIGN PATENT DOCUMENTS

| | | |
|---|---|---|
| EP | 1180854 A1 | 2/2002 |
| KR | 1999-0054245 | 7/1999 |
| KR | 2001-0096498 | 11/2001 |
| WO | WO-00/62441 A1 | 10/2000 |
| WO | WO-01/76095 A1 | 10/2001 |
| WO | WO-01/76263 A2 | 10/2001 |
| WO | WO-2004/059875 A1 | 7/2004 |

OTHER PUBLICATIONS

Janne Kurjenniemi et al., "Improving UTRA TDD Downlink Power Control With Asymmetrical Steps", Vehicular Technology Conference, 2003. The 57th IEEE Semiannual, vol. 4, pp. 2480-2484, Apr. 2003.

Sung-Hyuk Shin et al., "Pathloss-Aided Closed Loop Transmit Power Control for 3G UTRA TDD", Vehiccular Technology Conference, 2003. The 57th IEEE Semiannual, vol. 4, pp. 2226-2230, Apr. 2003.

Janne Kurjenniumi et al., "Signaled Step Size for Downlink Power Control of Dedicated Channels in UTRA TDD", Mobile and Wireless Communications Network, 2002. 4th International Workshop on, Vol. pp. 675-679, 2002.

"3rd Generation Partnership Project; Technical Specification Group Radio Access Network; FDD Enhanced Uplink; Overall description; Stage 2 (Release 6)", 3GPP TS 25.309 V6.2.0, Mar. 2005, 30 pgs.

* cited by examiner

METHOD, APPARATUS AND COMPUTER PROGRAM PROVIDING SIGNALING OF CONFIGURABLE POWER STEP SIZES FOR HIGH SPEED UPLINK PACKET ACCESS (HSUPA)

CROSS REFERENCE TO RELATED APPLICATION

This application claims priority to U.S. Provisional Patent Application Ser. No. 60/678,046, filed on May 4, 2005, and which is hereby incorporated by reference in its entirety.

TECHNICAL FIELD

The teachings of this invention relate generally to wireless communication systems and, more specifically, relate to digital wireless communications systems wherein a wireless transmission from a user equipment (UE) to a network node is power controlled.

BACKGROUND

Generally, three nodes of the communication system are relevant: the Radio Network Controller RNC, a Node B, and a user equipment UE. The Node B is interchangeably referred to as a base transceiver station BTS, and the UE is interchangeably referred to as a mobile station MS. The RNC and Node B are elements of the network, whereas the UE communicates with the network but is not considered a part thereof. Multiple Node Bs are typically under the control of one RNC, and typically multiple UEs are under the control of one Node B. Power control is an important feature in any packet-switched wireless system to enable multiple users to access the system simultaneously.

In HSUPA (High Speed Uplink Packet Access) involves enhancements of the uplink dedicated transport channel (DCH), hereafter referred to as E-DCH, for packet data-traffic as per Release 6 of 3GPP TS 25-321. In HSUPA one enhancement of interest relates to distributing some of the packet scheduler functionality to Node Bs (which may also be referred to as base transceiver station equipment). One reason for making this type of redistribution is to achieve a more rapid scheduling of bursty (e.g., packetized), non real-time (e.g., data rather than voice) traffic than can be accomplished using the Layer 3 (L3) of the Radio Network Controller (RNC). The basic premise is that with faster adaptation of the radio link it is possible to more efficiently share the uplink power resource between packet data users. For example, when data packets have been transmitted from one UE the scheduled resource can be made available immediately to another UE. This approach seeks to avoid the peaked variability of noise rise, when high data rates are being allocated to users running bursty, high data-rate applications.

In the current system-level architecture the packet scheduler is located in the RNC and, therefore, is limited in its ability to adapt to the instantaneous traffic due at least to bandwidth constraints on the Radio Resource Control (RRC) signaling interface between the RNC and the UE. Hence, to accommodate the variability the packet scheduler is designed to be conservative in allocating uplink power in order to take into account the influence from inactive users in a next scheduling period. However, this conservative approach is spectrally inefficient for allocated high data-rates and long release timer values.

With E-DCH, much of the packet scheduler functionality is transferred to the Node B, i.e., there is defined a Node B scheduler that is responsible for allocating uplink resources. For this type of scheduling to be performed efficiently, the Node B needs to obtain a data rate request from the UE. After a scheduling decision is made the Node B can inform the UE of the decision by sending absolute and relative grants. With an absolute grant a certain power is allocated to the E-DCH data packet channel E-DPDCH (wherein the prefix E before a channel indicates a channel within the regime of enhancements to uplink dedicated data channel architecture). This power is given relative to the power on the dedicated physical control channel DPCCH (e.g., a ratio of E-DPDCH power to DPCCH power). The relative grant channels E-RGCH contain UP/KEEP/DOWN commands, which the UE responds to as follows. When the UE receives an UP command, the UE increases its transmit power allocation by a certain step size, and when the UE receives a DOWN command it reduces its power allocation by a certain step size. The possible step sizes are sent by the RNC to the UE.

Currently, the E-DPDCH to DPCCH power ratio (power ratio between the E-DPDCH and DPCCH) is defined to be in the range of $-10, \ldots, +21$ dB, with a uniform 1 dB granularity, i.e., the uplink power control range is defined as 32, 1 dB steps. For example, when a Node B desires the UE to change its transmit power on E-DPDCH, it sends an UP or DOWN command on the relative grant channel. The UE responds by adjusting its power, which was received on the absolute grant channel as a ratio of E-DPDCH to DPCCH, either +1 dB or −1 dB, respectively. Further UP and DOWN commands further adjust the UE's transmit power on E-DPDCH by +/−1 dB for each command. This leads to slower link adaptation where the desired power change is more than +/−1 dB, regardless of whether the Node B or the RNC is originally determining the desired power for the UE to transmit.

SUMMARY

The foregoing and other problems are overcome, and other advantages are realized, in accordance with the presently described embodiments of these teachings.

In accordance with an exemplary embodiment of the invention, there is provided an a method for controlling power in a wireless communication system. In the method, a first message is transmitted to a mobile station that indicates a first power at which the mobile station may transmit data on a radio resource. At least one step size is selected from a set of power control increment step sizes. The set is characterized in that at least one increment step size of the set differs from at least one other increment step size of the set. A second message is then transmitted to the mobile station that indicates a second power at which the mobile station may transmit on the radio resource. The second message indicates the second power as a function of the first power and the selected at least one step size.

In accordance with another exemplary embodiment of the invention, there is provided a program of machine-readable instructions, tangibly embodied on an information bearing medium and executable by a digital data processor, to perform actions directed toward providing a power control to a mobile station. In this embodiment, the actions include sending a first message to the mobile station, selecting from a set of power control increment step sizes at least one step size of the set, and sending a second message to the mobile station. The first message indicates a first power at which the mobile station may transmit data on a radio resource. The second message is sent after the first, and indicates a second power at which the mobile station may transmit on the radio resource as a function of the first power and of the selected at least one step size. The set of power control increment step sizes is characterized in that at least one increment step size of the set differs from at least one other increment step size of the set.

In accordance with another exemplary embodiment of the invention, there is provided a network element that includes circuitry configured to send to a mobile station a first message that indicates a first power at which the mobile station may transmit data on a radio resource. The circuitry is further configured to select at least one step size from a set of power control increment step sizes, where at least one increment step size of the set differs from at least one other increment step size of the set. Further, the circuitry is configured, after selecting the at least one step size, to compile and send to the mobile station a second message that indicates a second power at which the mobile station may transmit on the radio resource. The second message indicates the second power as a function of the first power and the selected at least one step size.

In accordance with another exemplary embodiment of the invention, there is provided an apparatus that includes means for storing a known power value and for storing a set of power control increment step sizes, where at least one increment step size differs from at least one other increment step size. The means for storing may be, for example, a computer readable storage medium of the electronic, optical, or magnetic variety. The apparatus further includes means for determining a desired power level that is offset from the known power value by at least one element of the set. The means for determining may include a transceiver coupled to a processor and the computer readable storage medium. The apparatus may be a mobile station, in which case the apparatus further transmits user data at the desired power and determines the at least one element of the set by a received power control message. The apparatus may be a network element such as a base transceiver station, in which case it further transmits an indication of the at least one element of the set to a mobile station as a power control message, where the at least one element of the set commands the desired power as a function of the known power value and the at least one element of the set.

In accordance with another exemplary embodiment of the invention, there is provided a method of operating a mobile station. In this method, a set of power control step size increments is received and stored, wherein at least two increments of the set are not identical. At a first time, a first message is received that indicates a first power control value. User data is transmitted over a radio resource at a power not exceeding the first power control value. At a second time following the first time, a second message is received that indicates at least one increment of the set. From the second message is determined a second power control value as a function of the first power control value and the at least one increment of the stored set. User data is then transmitted over the radio resource at a power not exceeding the second power control value.

In accordance with another exemplary embodiment of the invention, there is provided a method for controlling transmit power in a mobile station. In this method, user data is transmitted over a data channel at a first power level. Next, a relative grant message is received that includes one of an UP or DOWN indication and an index. A power adjustment value is determined from a stored database and the index. The database is stored locally in the mobile station, and the power adjustment value is correlated in the database with the index. If the relative grant message includes the UP indication, then the power adjustment value determined from the database is added to the first power to yield a second power, and user data is then transmitted over the data channel at a power no less than the second power. Or, if the relative grant message includes the DOWN indication, the power adjustment value determined from the database is subtracted from the first power to yield a third power, and user data is transmitted over the data channel at a power not exceeding the third power. The database may be in the form of a lookup table, an algorithm to generate a correlation between indices and power adjustment values, or some other format for correlating data strings in a memory.

Further details as to various embodiments and implementations are detailed below.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION OF EMBODIMENTS OF THE INVENTION

As noted above, embodiments of the invention relate to power control in wireless communications. Given the above background, it is determined that in the situation where a Node B is authorized to use a relative grant, some speed in link adaptation is lost where the step size is only 1 dB as is the case in the prior art. For example, if the Node B desires the UE to increase power by several dB, there are required several control messages to the UE, each commanding it to increase by one step size. While the signaling overhead associated with several control messages as compared to one represents a clear waste of radio resources, the time delay in the above architecture results in the radio resources not being most efficiently allocated, a potentially much greater inefficiency.

Figure 1:
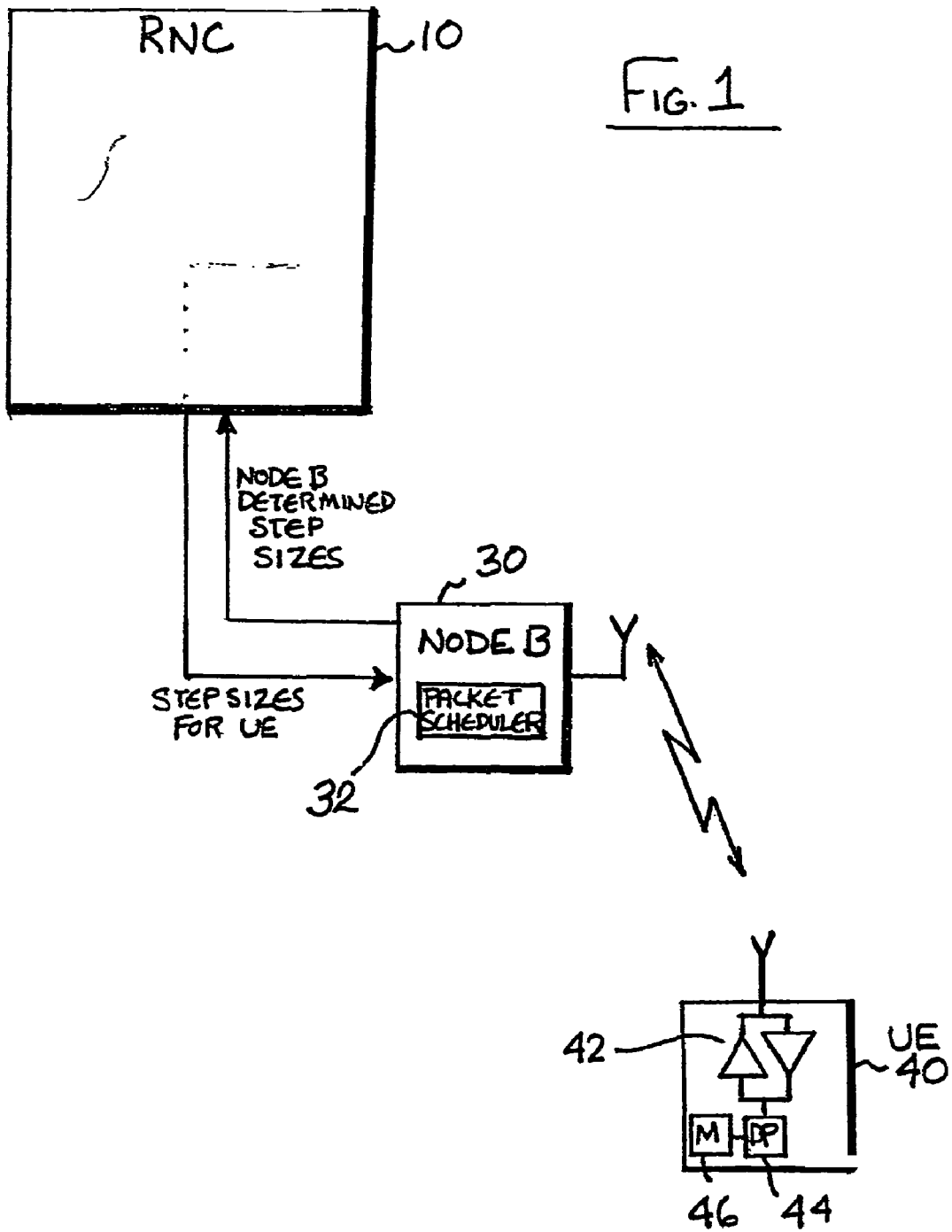
FIG. 1 is a system level block diagram illustrating components that operate in accordance with an embodiment of the invention.

Referring to FIG. 1, a Radio Network Controller RNC 10 is coupled to a Node B 30 (alternatively termed herein a base transceiver station BTS), which in turn is coupled through wireless links to a User Equipment UE 40 (alternatively termed herein a mobile station MS). The UE 40 is assumed to include a wireless radio frequency (RF) transceiver 42, a data processor (DP) 44 and a memory (M) 46 in which is stored a program for execution by the DP 44. The Node B 30 is assumed to also include a transceiver, a data processor and a memory, and the RNC is assumed to include a data processor and a memory as well. Both the Node B 30 and the US 40 include at least one antenna for communicating with one another over various wireless channels. The RNC 10—and the BTS 30 may communicate wirelessly or via a hardwired link. Computer programs stored in the various memories include program instructions for causing the associated data processors to operate in accordance with this invention. Together, the transceiver, data processor, and memory may be considered circuitry, as their functionality for implementing embodiments of the invention may reside in hardware, software, or typically in a combination of both.

In general, the various embodiments of the UE 40 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The wireless communications capability is assumed to include a transmit function that is power controlled as discussed below.

Embodiments of this invention provide for a format (step sizes) of potentially non-equal configurable power control steps to be sent from the RNC 10 to the UE 40 via the Node B 30. The teachings of this invention also provide a mechanism for the Node B 30 to propose the format to the RNC 10, but it is equally possible that the step sizes are decided by the RNC 10 and given both to the UE 40 and the Node B 30, or are defined by a standard specification.

As was noted above, it has been previously determined to have the E-DPDCH to DPCCH power offset (e.g., the difference in power between the E-DPDCH and DPCCH) to be in the range of −10, . . . , +21 dB with 1 dB granularity, i.e., 32 steps. However, the inventors have determined that a 1 dB step increment is not sufficient for many cases. The below description uses the terminology of 3GPP TS-25.321, MAC Protocol Specification (release 6), but may be extended to a more general case for power control. As such, the teachings of specific channels, specific power level from which the offset is determined, and signaling protocol are exemplary and not considered to be limiting.

In accordance with the teachings of this invention the RNC 10 sends a set of step sizes to the UE 40, where the set contains possible power levels of the E-DPDCH (relative to the DPCCH). As one non-limiting example, instead of uniform 1 dB step increments as in the prior art, the increments may be −10, −8, −6, −3, 0, +3, +6, +10, +15, +21 dB. In this example it can clearly be seen that the step size increments need not be equal, and may be, for example, 3, 2, 3, 3, 3, 3, 4, 5 and 5 dB. Note that in the set of step size increments that at least one increment step size differs from at least one other increment step size. The UE 40 is responsive to receiving an UP command, and if the current power allocation is (for example) +3 dB, then the UE 40 next begins using +6 dB, which is the next higher defined step size increment in the step size sequence that is greater than +3 dB. The same procedure applies when the UE receives a DOWN command. In this manner, the power adjustment (the current step size) commanded by an UP or DOWN command is a function of the currently used power on the data channel for which power is to be adjusted (e.g., the E-DPDCH). This was not the case in the prior art, because all step sizes for data channel power were uniform, so the current power on E-DPDCH was irrelevant to any particular UP or DOWN command; each command was always an increase or decrease of 1 dB. The invention may use a fixed set of step sizes, but more preferably they are configurable in the network to enable adaptation to changing conditions where smaller or larger step sizes would be more appropriate.

Further in accordance with the teachings of this invention the Node B 30 may determine the step sizes. This is desirable at least for the reason that the step sizes, and the scheduling algorithm and update frequency together, have a large impact on the overall performance. It is therefore beneficial that the step sizes be determined at the same location in the system where the scheduling algorithm resides.

Thus, in this embodiment of the invention the Node B 30 defines a set of steps for the UE 40 E-DCH power control. This definition may be static and defined by a Node B packet scheduler 32 implementation, or it could be UE-specific. For example, the set of step size increments based on a measured or received link quality for the specific wireless link between the Node B 30 and the UE 40. In that instance, the Node B will send the relevant link quality data to the RNC 10 (or the Node B may determine the set of step sizes itself). The RNC 10 receives the link quality information or the determined set of step sizes from the Node B 30, and subsequently signals the set of steps to the UE 40 when, for example, the E-DCH connection is set up. The UE 40 receives and stores in the memory 46 the set of steps from the RINC 10 (which is sent via the Node B 30), and operates in accordance with the stored steps when receiving UP/DOWN signals from the Node B 30.

Further in accordance with the teachings of this invention the RNC 10 may determine the step sizes. This is desirable at least for the reason that the step sizes could be defined to be UE-specific, based on information accessible to the RNC 10 that is related to, for example, the UE 40 subscription and services. More simply, the RNC 10 may determine a set of step size increments that is used over its entire portion of the network, or at least uniformly within the cell of the specific Node B 30. Such a uniform implementation may of course allow for updates to the set from time to time, such as daily, weekly or monthly.

Thus, in this embodiment of the invention the RNC 10 defines a set of steps for the UE 40 E-DCH power control. This definition may be static and defined by the network planning and inputted to the RNC 10, or it could be UE-specific. The Node B 30 receives the set of steps from the RNC 10, as well as signaling the set of steps to the UE 40 when, for example, the E-DCH connection is set up. The UE 40 receives and stores in the memory 46 the set of steps from the RNC 10 (via the Node B 30, and operates in accordance with the stored steps when receiving UP/DOWN signals from the Node B 30.

Figure 2:
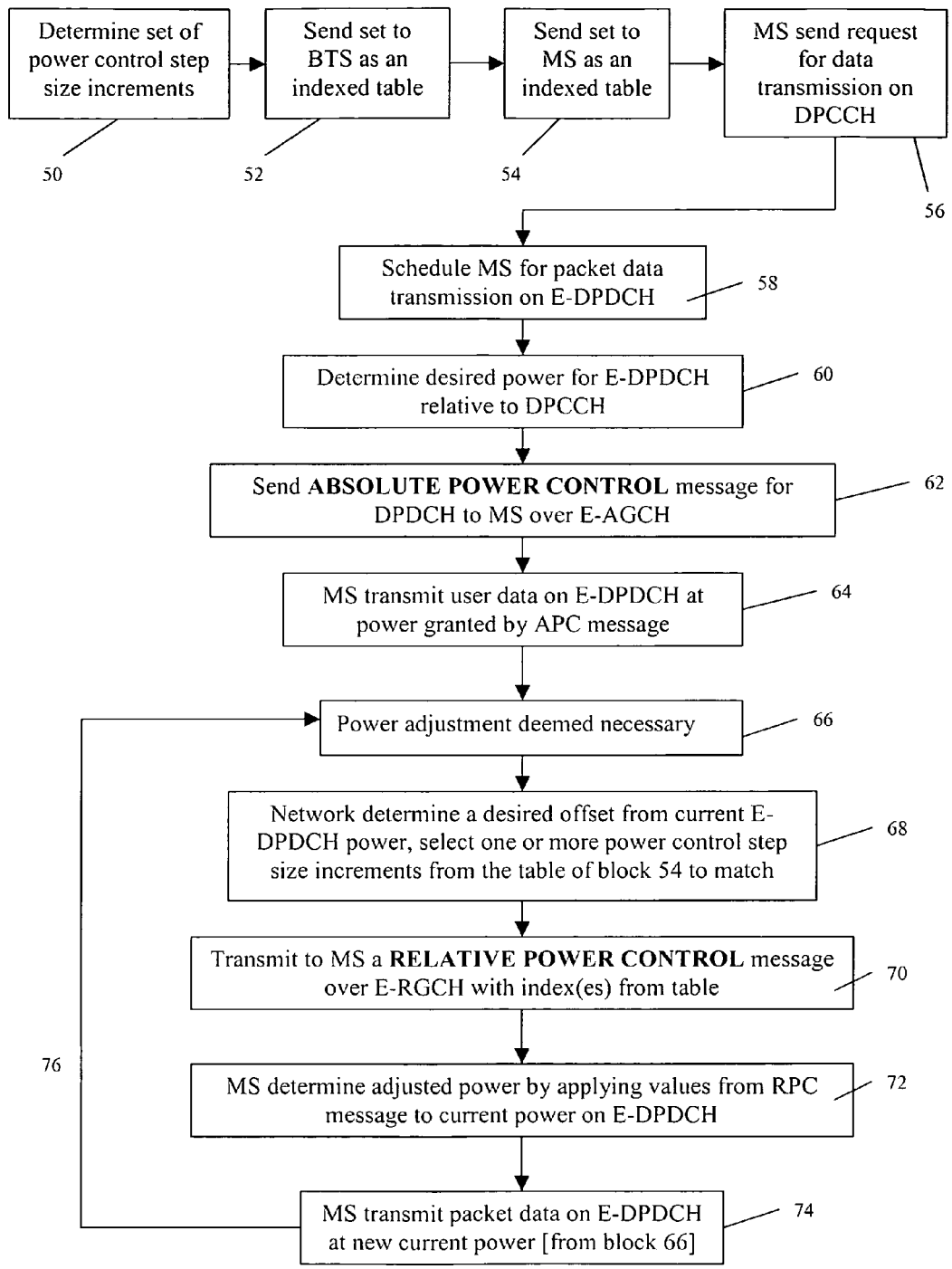
FIG. 2 is a process diagram showing steps according to an embodiment of the invention.

FIG. 2 illustrates process steps according to an embodiment. At block 50, the set of power control step sizes is determined. If the set is determined by the RNC 10, then at block 52 the set is sent to the BTS 30 as a table with index numbers associated with each different step size. As an example, an indexed table for the above exemplary set of step sizes given above would be:

| Step size | −10 | −8 | −6 | −3 | 0 | +3 | +6 | +10 | +15 | +21 |
|---|---|---|---|---|---|---|---|---|---|---|
| Index | 0 | 1 | 2 | 3 | 4 | 5 | 6 | 7 | 8 | 9 |

If the BTS 30 determines the step sizes, then block 52 is unnecessary but the BTS 30 would instead send the indexed table to the RNC 10 to keep the RNC 10 informed of activities in the cell. Continuing in FIG. 2, the BTS 30 sends the indexed table to the MS 40. Where the RNC 10 determines the set, the RNC 10 may send a message directed to the MS 40 that includes the indexed table, in which case the BTS 30 may merely forward that message. The step sizes may be in the form of a lookup table, an algorithm, or other data structure that defines the step sizes.

At some later point in time, it is determined that the MS 40 has additional packet data for transport in accordance with enhanced protocol. Typically, the MS will request an enhanced data channel to begin the next sequence of FIG. 2. The MS 40 requests radio resources at block 56 over a control channel, such as the DPCCH. In some embodiments, the MS 40 will request a specific data rate and the network will try to accommodate that requested data rate by allocating a channel over which it can grant the appropriate power. The MS 40 is scheduled for packet data transmission over an enhanced dedicated transport channel E-DCH at block 58, specifically the E-DPDCH (enhanced dedicated physical data channel). This scheduling may be done by the RNC 10, or by the BTS 30, as detailed above. In either case, the respective network element 10, 30 will have a packet scheduler 32 functionality built into software, hardware, or a combination of software and hardware, to schedule that particular MS 40 for packet data transmissions on the intended E-DPDCH.

Upon scheduling the MS 40 as in block 58, the desired power for transmissions on that E-DPDCH is determined at block 60 relative to the power used by the MS 40 on the DPCCH (at block 56) in requesting the data channel. The BTS 30 then sends to the MS 40 an ABSOLUTE POWER CONTROL (APC) message at block 62, which informs the MS 40 of a power level for which to transmit on the dedicated physical control channel E-DPDCH (in the form of a ratio with power on DPCCH). This APC message is sent over the enhanced absolute grant channel E-AGCH, and may include the actual grant to the MS of radio resources over which to transmit its packet data. Note that the APC message gives E-DPDCH power relative to DPCCH power; the network determines from a message sent by the MS over the control channel (at block 56) what the MS's maximum power should be on the (enhanced) data channel, and sends at block 62 the absolute grant as a ratio of data channel power to control channel power. This is the maximum power at which the MS 40 can transmit on the data channel, until the network grants a new maximum power. Whatever its maximum allowed power, the MS 40 selects a data rate appropriate for that maximum allowed power and transmits at that rate and power. At block 64 of FIG. 2, the MS 40 then transmits its user data on the data channel at the power level granted on the absolute grant channel, which is a power level relative to a power on the control channel.

Now consider that the network determines at block 66 that the power level at which the MS 40 transmits on that data channel should be changed. The reason is not particularly important; the MS 40 may request a higher data rate, the BTS 30 may determine that a power adjustment is necessary to keep all MSs in its cell within a narrow band of received power, etc. Regardless of the reason an adjustment is warranted, and so the adjustment is calculated in the network at block 68 as an offset from the power currently being used by the MS 40 on the data channel, which by the above steps is that granted on the absolute grant channel. An appropriate value from the table of block 54 is also selected at block 68 to match that offset, and sent at block 70 to the MS 40 in a RELATIVE POWER CONTROL (RPC) message on the relative grant channel.

There are several ways to implement blocks 68 and 70 so that the RPC message to the MS identifies a specific power offset. In one implementation, the single value of an element of the set is selected to best approximate the desired power, and the index associated with that single value is sent in the message of block 70. In another implementation, a number of elements of the set are chosen so that their sum equals or best approximates the desired offset. In that instance, the message of block 70 includes a set of bits, each associated with one element of the set. A bit of one value (e.g., bit-on or 1) indicates that the associated element of the set is included in the sum; whereas an opposed bit value (e.g., bit-off or 0) indicates that the associated element is not to be summed. Using the table above having ten elements and where each bit position corresponds to the order of bits given in that table (left to right), a desired offset of −5 may be represented by the bit sequence [0, 1, 0, 0, 0, 1, 0, 0, 0, 0], which results in the sum of [(−8)+(+3)] to yield a −5 offset (elements associated with the zero bits are not summed). In another implementation, the message of block 64 includes a command UP and DOWN followed by an index number for an element of the table, which command the MS directly to access that element in the table adjacent to the current power setting in use and adjust power up or down by the amount matching the index. In this implementation, the table need include only absolute values, not positive and negative values. In another implementation, the power set over the absolute grant channel corresponds to the zero step size (index 0 in the example table), and subsequent UP and DOWN commands move along the table by the next subsequent step size. For example, assume an absolute grant of 17 dB, followed by the relative grants of UP, UP, UP, DOWN. The power set in the MS 40 for transmissions on the E-DPDCH are then 20 dB (first UP command signals +3 over the 17 dB absolute grant power), 26 dB (next UP command signals +6 over the current power of 20 dB), 36 dB (next UP command signals +10 over the current power of 26 dB), and 22 dB (following DOWN command signals −4 from the current power of 36 dB). In this instance, both the BTS 30 and the MS 40 set a dynamic marker or use some memory to indicate which step size of the table was last employed in a power change.

Regardless of the specific implementation for selecting the element or elements from the table, of which the above are non-limiting examples, the RPC message is sent to the MS 40 at block 70. This may be compiled by the RNC 10 and sent through the BTS 30, or compiled and sent by the BTS 30 alone, and is sent in one implementation on the enhanced relative grant channel E-RGCH. The E-RGCH is a logical channel that differs from the E-AGCH. The MS 40 receives that RPC message at block 72 and determines the appropriate (adjusted) power by applying the element(s) of the table identified by that RPC message as an offset to the current power that the MS 40 is using to transmit on the data channel. The MS 40 then transmits its packet data over the E-DPDCH at block 74 using the power determined at block 72. Call this the new current power.

Now assume that a new adjustment is required. The feedback loop 76 of FIG. 2 finds the network determines again at block 66 that a new (additional) power adjustment is required, and selecting at block 68 a step size from the table in relation to the current adjusted power, and sends an appropriate RPC message to the MS 40 as above. In this instance, the MS 40 further tailors the adjusted power from the first iteration of block 68 by the step size in the second RPC message. That is, the offset is applied to the MS's current transmit power on the data channel, which will be the original power granted in the APC message only where there have been no intervening adjustments made to it. Further adjustments via the feedback loop 74 may continue for as long as the grant of radio resources, the enhanced data channel itself, is valid for that MS 40. Whether the step size is applied to the power given in the APC message received over the E-AGCH, or the adjusted power as determined by an earlier RPC message received over the E-RGCH, the offset is applied in the given step size against the current power being used on the data channel. Whereas the power initially granted/commanded in the APC message is relative to power on the DPCCH, the adjusted power granted/commanded in any of the RPC messages, including the first, is a function of the current power on the DPDCH. This is because the network selects a step size based on a desired offset from the current power, not a generic UP or DOWN command to step a uniform and invariant 1 dB step.

In the various implementations above, certain hybrid implementations may be readily derived. For example, as with the UP/DOWN command implementation, an initial RPC message may give an offset directly relative to power on the DPCCH and subsequent adjustments under that same grant of radio resources may give adjustments relative to current power on the E-DPDCH, but by using an index number of the table rather than the UP/DOWN command. The table may include only absolute value elements, and the RPC message may include [UP, index #] or [DOWN, index #]. Various other combinations may become apparent.

In a preferred but non-limiting embodiment the signaling between the BTS 30 and the RNC 10 uses a NBAP (Node B Application Part) protocol, while the signaling between the RNC 10 and the MS 40 uses the Radio Resource Control (RRC) protocol. The RPC message may be transmitted from the BTS 30 to the MS 40 using the E-RGCH (EDCH Relative Grant Channel) channel, as noted above.

While the set of step sizes may be dynamically configurable in real time based on measured or estimated channel conditions, a more balanced implementation is seen to adjust the step sizes only occasionally, such as daily or less often. Regardless, for any utilization by the MS 40 of granted radio resources, the set of steps could be fixed, and thus known a priori by the relevant network nodes 10, 30 and the MS 40, such as when communicated as a set as in FIG. 2 prior to any setup of the E-DCH by the network.

The use of these embodiments of the invention is advantageous at least for the reasons that the step sizes are configurable, which gives additional flexibility, and the decision can be made at the location where the knowledge of the packet scheduling is located (e.g., in the Node B 30 packet scheduler 32, although the decision could also be made in a RNC packet scheduler).

It can be noted that while some additional signaling is used between the Node B 30 and the RNC 10, the step sizes need not change very often (perhaps only on a weekly/monthly basis), so the additional amount of signaling may be minimal.

Based on the foregoing description of the embodiments of this invention it can be appreciated that an aspect of this invention relates to a method, apparatus and a computer program to operate a network element to determine a set of power control increment step sizes, where at least one increment step size differs from at least one other increment step size. In the preferred embodiments the determined set is communicated to a UE. The network element is preferably one where a packet scheduler function resides.

Based on the foregoing description of the embodiments of this invention it can be appreciated that a further aspect of this invention relates to a method, apparatus and a computer program to operate a UE to receive and store a set of power control increment step sizes, where at least one increment step size differs from at least one other increment step size, and in response to receiving an UP command or a DOWN command, to switch to using a next increment from the set of stored power control increment step sizes.

Based on the foregoing description of the embodiments of this invention it can be even further appreciated that another aspect of this invention relates to a data structure that is stored in a tangible computer-readable medium, where the data structure comprises a set of power control increment step sizes, where at least one increment step size differs from at least one other increment step size.

The embodiments of this invention may be implemented by computer software executable by a data processor 44 of the RNC 10, BTS 30, MS 40 or other host device, or by hardware, or by a combination of software and hardware. Further in this regard it should be noted that the various blocks of the logic flow diagram of FIG. 2 may represent program steps, or interconnected logic circuits, blocks and functions, or a combination of program steps and logic circuits, blocks and functions.

The memory or memories 46 (whether in the RNC 10, BTS 30 or MS 40) may be of any type suitable to the local technical environment and may be implemented using any suitable data storage technology, such as semiconductor-based memory devices, magnetic memory devices and systems, optical memory devices and systems, fixed memory and removable memory. The data processor(s) 44 (whether in the RNC 10, BTS 30 or MS 40) may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method comprising:
    transmitting information on a determined set of power control increment step sizes to a mobile station;
    transmitting, over a first control channel, an absolute power control message to the mobile station, said absolute power control message indicating a first power which may be used to determine a second power at which the mobile station may transmit data;

selecting, in a network, from the determined set of power control increment step sizes at least one power control increment step size of the determined set, wherein at least one power control increment step size of the set differs from at least one other increment step size of the determined set; and transmitting, over a second control channel different from the first control channel, a relative power control message to the mobile station, said relative power control message indicating the selected at least one power control increment step size of the determined set for determining at the mobile station a second power at which the mobile station may transmit as a function of the first power and the selected at least one step size, wherein different power control increment step sizes are used for different parts of a full range of a power ratio of an enhanced dedicated physical data channel to a dedicated physical control channel.

2. The method of claim 1, further comprising: determining in a network element of the network the set of power control increment step sizes from a set of proposed power control increment step sizes.

3. The method of claim 2, further comprising:
sending to a radio network controller a set of proposed power control increment step sizes, and wherein the determined set of power control increment step sizes is determined by the radio network controller at least in part from the set of proposed power control increment step sizes; and
sending to the mobile station the determined set of power control increment step sizes.

4. The method of claim 1, further comprising:
selecting from the determined set of power control increment step sizes at least another step size;
transmitting a third message to the mobile station on the second control channel, the third message indicating the selected at least another power control increment step size of the set for determining at the mobile station a third power at which the mobile station may transmit as a function of the second power and the selected at least another step size, wherein the selected at least another power control increment step size is based on a current transmission power of the mobile station.

5. The method of claim 1, further comprising determining in a network element the determined set of power control increment step sizes as a function of link quality between a serving base transceiver station and the mobile station.

6. A non-transitory computer readable storage medium embodied with a computer program executable by a digital data processor, to perform actions directed toward providing a power control to a mobile station, the actions comprising:
transmitting information on a determined set of power control increment step sizes to the mobile station;
sending, on a first control channel, an absolute power control message to the mobile station, said absolute power control message indicating a first power which may be used to determine a second power at which the mobile station may transmit data;
selecting, in a network, from the determined set of power control increment step sizes at least one power control increment step size of the determined set, wherein at least one power control increment step size of the set differs from at least one other power control increment step size of the determined set; and
sending, on a second control channel different from the first control channel, a relative power control message to the mobile station, said relative power control message indicating the selected at least one power control increment step size of the determined set for determining at the mobile station a second power at which the mobile station may transmit as a function of the first power and the selected at least one step size, wherein different power control increment step sizes are used for different parts of a full range of a power ratio of an enhanced dedicated physical data channel to a dedicated physical control channel.

7. The non-transitory computer readable storage medium of claim 6, further comprising determining the determined set of power control increment step sizes from a received set of proposed power control increment step sizes.

8. The non-transitory computer readable storage medium of claim 6, further comprising:
selecting from the determined set of power control increment step sizes at least another step size;
sending a third message to the mobile station, said third message indicating the selected at least another power control increment step size of the determined set for determining at the mobile station a third power at which the mobile station may transmit, wherein the third power is a function of the second power and the selected at least another step size.

9. The non-transitory computer readable storage medium of claim 6, wherein determining the determined set of power control increment step sizes is a function of link quality between a serving base transceiver station and the mobile station.

10. A network element comprising:
circuitry configured to send a determined set of power control increment step sizes to a mobile station;
circuitry configured to send to a mobile station an absolute power control message on a first control channel that indicates a first power which may be used to determine a second power at which the mobile station may transmit data;
circuitry configured to select at least one power control increment step size from the determined set of power control increment step sizes, where at least one increment step size differs from at least one other power control increment step size; and
circuitry configured to thereafter compile and send to the mobile station a relative power control message, on a second control channel different from the first channel, that indicates a power control increment step size selected by a network for the mobile station to determine a second power at which the mobile station may transmit as a function of the first power and the selected at least one power control increment step size, wherein different power control increment step sizes are used for different parts of a full range of a power ratio of an enhanced dedicated physical data channel to a dedicated physical control channel.

11. The network element of claim 10, wherein the network element comprises a base transceiver station, the base transceiver station further comprising circuitry configured for receiving the determined set of power control increment step sizes from a radio network controller, prior to wirelessly sending the relative power control message.

12. The network element of claim 11, wherein the base transceiver station further comprises circuitry configured to compile and send to the radio network controller a set of proposed power control increment step sizes, prior to receiving the determined set of power control increment step sizes.

13. The network element of claim 12, wherein the set of proposed power control increment step sizes is derived in the base transceiver station based on a link quality between the base transceiver station and the mobile station.

14. The network element of claim 10, wherein the network element comprises a base transceiver station that further comprises the circuitry configured to send the set to the mobile station.

15. The network element of claim 14, further comprising circuitry configured to determine the set of power control increment step sizes.

16. The network element of claim 10, further comprising circuitry configured to select from the set at least another power control increment step size and to transmit to the mobile station a third message over the second control channel indicating the selected at least one power control increment step size of the set for determining at the mobile station a third power at which the mobile station may transmit as a function of the second power and the selected at least another power control increment step size.

17. An apparatus comprising:
means for storing a known power value and information on a set of power control increment step sizes determined by and received from a network element, where at least one power control increment step size differs from at least one other power control increment step size; and
means for determining a desired power level that is offset from the known power value by the at least one power control increment step size of the set, wherein the at least one power control increment step size of the set is identified in a relative power control message, wherein the known power value is identified in an absolute power control message, wherein the desired power level is determined by one of subtracting the at least one power control increment step size from the known power value or adding the at least one power control increment step size to the known power value, wherein different power control increment step sizes are used for different parts of a full range of a power ratio of an enhanced dedicated physical data channel to a dedicated physical control channel.

18. The apparatus of claim 17, wherein:
the means for storing comprises a computer readable storage medium; and
the means for determining comprises a transceiver coupled to a processor and the computer readable storage medium for determining the desired power level from the received power control message.

19. The apparatus of claim 17, further comprising means for transmitting user data at the desired power level; wherein the means for determining offsets the known power by the at least one power control increment step size of the set.

20. A method, comprising:
receiving and storing, at a mobile station, information on a set of power control increment step sizes determined by and received from a network, wherein different power control increment step sizes are used for different parts of a full range of a power ratio of an enhanced dedicated physical data channel to a dedicated physical control channel;
receiving, on a first control channel, an absolute power control message that indicates a first power control value;

receiving, on a second control channel different from the first control channel, a relative power control message that indicates a power control increment step size according to the set selected by a network element;
determining from the relative power control message a second power control value as a function of the first power control value and the indicated power control increment step size of the stored set, the second power control value determined by one of adding the selected power control increment step size to the first power value or subtracting the selected power control increment step size from the first power control value, and transmitting user data over the radio resource at a power not exceeding the second power control value.

21. The method of claim 20, further comprising:
transmitting a request on a control channel;
wherein the first power control value is a function of power used to transmit the request.

22. A method comprising:
receiving, on a first control channel, an absolute power control message that comprises a first power level;
receiving, on a second control channel different from the first control channel, from a network, at a mobile station, a relative power control message that comprises an index and one of an UP or DOWN indication;
determining a power adjustment value that is correlated with the index in a locally stored database; and
if the relative power control message comprises the UP indication, adding the determined power adjustment value to the first power to yield a second power, and transmitting user data over the data channel at a power no less than the second power; or
if the relative power control message comprises the DOWN indication, subtracting the determined power adjustment value from the first power to yield a third power, and transmitting user data over the data channel at a power not exceeding the third power, wherein different power adjustment values are used for different parts of a full range of a power ratio of an enhanced dedicated physical data channel to a dedicated physical control channel.

23. The method of claim 22, wherein:
the data channel is a dedicated traffic channel;
the first control channel comprises an absolute grant channel; and
the second control channel comprises a relative grant channel.

24. The apparatus of claim 17, wherein the network element is one of a radio network controller and a base station.

25. The method of claim 1, wherein the set of power control increment step sizes is an indexed table.

26. The non-transitory computer readable storage medium of claim 6, wherein the set of power control increment step sizes is an indexed table.

27. The network element of claim 10, wherein the set of power control increment step sizes is an indexed table.

28. The apparatus of claim 17, wherein the set of power control increment step sizes is an indexed table.

29. The method of claim 20, wherein the set of power control increment step sizes is an indexed table.

* * * * *